US008792467B2

(12) United States Patent
Fang et al.

(10) Patent No.: US 8,792,467 B2
(45) Date of Patent: Jul. 29, 2014

(54) METHOD FOR DOWNLINK SUB-FRAME ALLOCATION, INFORMATION TRANSMISSION OR ACQUISITION IN A WIMAX EVOLVED SYSTEM

(75) Inventors: Huiying Fang, Shenzhen (CN); Hongyun Qu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 305 days.

(21) Appl. No.: 13/257,823

(22) PCT Filed: Sep. 23, 2009

(86) PCT No.: PCT/CN2009/074140
§ 371 (c)(1),
(2), (4) Date: Nov. 4, 2011

(87) PCT Pub. No.: WO2010/130120
PCT Pub. Date: Nov. 18, 2010

(65) Prior Publication Data
US 2012/0140744 A1 Jun. 7, 2012

(30) Foreign Application Priority Data
May 15, 2009 (CN) .......................... 2009 1 0141620

(51) Int. Cl.
| H04W 4/00 | (2009.01) |
| H04L 27/26 | (2006.01) |
| H04L 5/00 | (2006.01) |
| H04W 72/04 | (2009.01) |
| H04W 56/00 | (2009.01) |

(52) U.S. Cl.
CPC ....... *H04W 72/0446* (2013.01); *H04L 27/2602* (2013.01); *H04L 5/0094* (2013.01); *H04W 56/00* (2013.01); *H04L 5/0044* (2013.01)
USPC ...................................................... 370/338

(58) Field of Classification Search
None
See application file for complete search history.

(56) References Cited
U.S. PATENT DOCUMENTS

2008/0095195 A1* 4/2008 Ahmadi et al. ............... 370/478
2012/0063374 A1* 3/2012 Lim et al. ...................... 370/281
(Continued)

FOREIGN PATENT DOCUMENTS

| CN | 101198179 A | 6/2008 |
| WO | 2008039027 A1 | 4/2008 |
| WO | 2008049028 A1 | 4/2008 |

OTHER PUBLICATIONS

International Search Report in international application No. PCT/CN2009/074140, mailed on Feb. 25, 2010.
English Translation of the Written Opinion of the International Search Authority in international application No. PCT/CN2009/074140, mailed on Feb. 25, 2010.
(Continued)

*Primary Examiner* — Chirag Shah
*Assistant Examiner* — Amar Persaud
(74) *Attorney, Agent, or Firm* — Oppedahl Patent Law Firm LLC (57) ABSTRACT

The present invention provides a method for downlink sub-frame allocation in an evolved WiMAX system, which comprises: setting a IEEE 802.16m frame start offset as a parameter of a deployment area range, and setting a starting location of a IEEE 802.16m frame by each IEEE 802.16m base station within a same deployment area range in the system according to the IEEE 802.16m frame start offset; always allocating a start sub-frame of the IEEE 802.16m frame by the IEEE 802.16m base station as a IEEE 802.16m downlink sub-frame, and sending a super frame header including a synchronization symbol at the starting location of a first frame of a super-frame; or sending a synchronization symbol at the starting location of a first frame of a super-frame and sending a super frame header in a start sub-frame of the first frame of the super-frame; and TDM is performed on the synchronization symbol and the super frame header in the first frame of the super-frame.

20 Claims, 4 Drawing Sheets

(56) References Cited

U.S. PATENT DOCUMENTS

2012/0093080 A1* 4/2012 Lee et al. .................. 370/328
2012/0140730 A1* 6/2012 Marks et al. ................ 370/330

OTHER PUBLICATIONS

Backward Compatible FDD 802.16m Frame Structure for Full-Duplex and Half-Duplex MS Operations, Mar. 10, 2008.

* cited by examiner

METHOD FOR DOWNLINK SUB-FRAME ALLOCATION, INFORMATION TRANSMISSION OR ACQUISITION IN A WIMAX EVOLVED SYSTEM

TECHNICAL FIELD

The present invention relates to the field of wireless communication, in particular to a method for downlink sub-frame allocation, or to a method for allocation information transmission, or to a method for acquiring downlink sub-frame allocation information by a terminal in a next-generation Worldwide Interoperability for Microwave Access (WiMAX) system.

BACKGROUND

By converting data stream of high-speed transmission to data stream of low-speed parallel transmission, Orthogonal Frequency Division Multiplexing (OFDM) greatly reduces the sensitivity of a system against the frequency selectivity of multipath fading channels. By introducing a cyclic prefix, the OFDM further enhances the capability of the system of resisting intersymbol interference. Furthermore, the features such as a high utilization rate of the bandwidth and simple implementation make the application of the OFDM in the field of wireless communication even wider. A WiMAX system, which is based on Orthogonal Frequency Division Multiple Access (OFDMA), is a system using the OFDM technology.

The advancing wireless communication technology and the changing market demands require that technologies and standards can absorb new technologies through the process of constant evolution and meet new requirements at the same time. Through the process of evolution, standards and systems realized according to the standards not only can continue the life thereof by smooth upgrade and protect the existing resources of subscribers, but also provide more and better services compared with old systems. With the rapid development of communication technologies, mobile WiMAX systems based on IEEE 802.16e (16e for short) air interface standard can not meet the demands on high transmission speed, high throughout, rapid movement and low time delay of wideband mobile communication in the future. At present, the TGm task group of IEEE 802.16 workgroup is committing itself to formulating improved air interface specifications IEEE 802.16m (16m for short), which can support a higher peak rate, spectrum effectiveness and sector capacity.

A 16m system in this document expresses a WiMAX system adopting air interface standard IEEE 802.16m and comprises a backward compatible 16m system (also called a 16m/16e hybrid system) and a non-backward-compatible 16m system (also called a 16m-only system). A base station in the 16m system is called a 16m base station. As defined by the IEEE 802.16m, a downlink sub-frame in the 16m-only system is called a 16m downlink sub-frame and a terminal in the 16m-only system is called a 16m terminal. While a 16e system expresses a WiMAX system adopting air interface standard IEEE 802.16e. As defined by the IEEE 802.16e, a downlink sub-frame in the 16e system is called a 16e downlink sub-frame and a terminal in the 16e system is called a 16e terminal. The backward compatible 16m system comprises both 16m downlink sub-frames and 16e downlink sub-frames and can serve both the 16m terminal and the 16e terminal.

Figure 1:
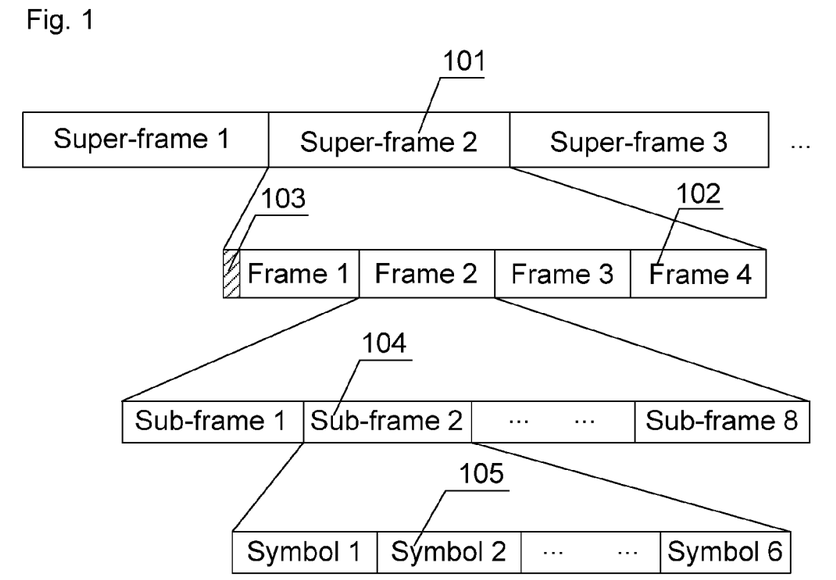
FIG. 1 is a diagram of super-frame structure constitution suggested in the current design of a 16m frame structure.

In order to realize the effective application of low delay services in the 16m system, a current design of a 16m frame structure mainly takes a three-layer design concept of superframe, frame and sub-frame into consideration. FIG. 1 is a diagram of super-frame structure constitution suggested in the current design of a 16m frame structure. The length of a super-frame 101 is 20 ms and consists of 4 frames 102 each with a length of 5 ms, and super-frame control information 103 is located in a plurality of symbols at the start of the super-frame. The frame 102 consists of 8 sub-frames 104, wherein the sub-frames 104 are divided into downlink sub-frames and uplink sub-frames and can be configured according to the system. The sub-frame 104 is composed of 6 OFDM symbols 105. According to the frame structure as shown in FIG. 1, the frame with a length of 5 ms comprises 8 sub-frames.

On the basis of the three-layer frame structure of superframe, frame and sub-frame, the 16m system also must take backward compatibility with an existing WiMAX terminal into consideration and therefore, it is necessary to think about allocation of 16m sub-frames and 16e sub-frames and reasonable configuration for a frame structure to reduce interference among systems with different configurations.

Figure 2:
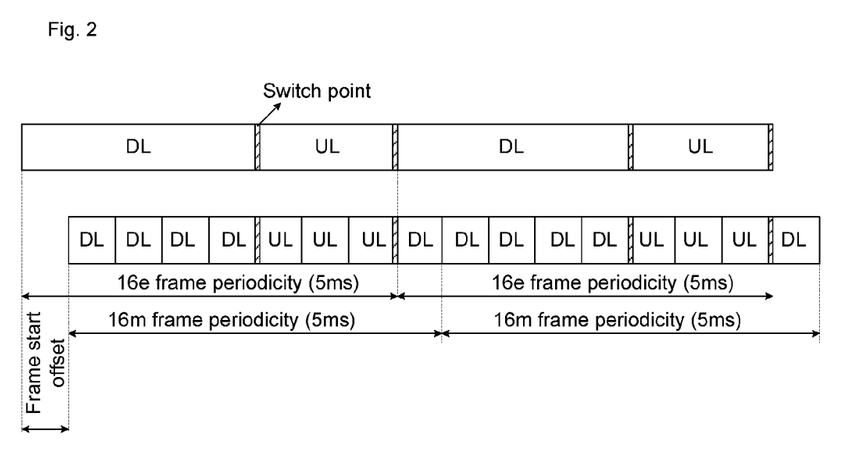
FIG. 2 is a diagram of a 16m frame start offset in a backward compatible 16m frame structure.

A super frame header is in a sub-frame at the start of the super-frame. In a backward compatible 16m frame structure, a downlink comprises 16e downlink sub-frames and 16m downlink sub-frames. As different base stations have different 16e and 16m service requirements, in order to enhance the resource utilization rate of the 16e/16m hybrid system, the hybrid ratio of 16e downlink sub-frames to 16m downlink sub-frames may be set different for different base stations, while in the same base station, the hybrid ratio of 16e downlink sub-frames to 16m downlink sub-frames may also vary by taking a super-frame as a minimum periodicity according to the change of services. The description file of the current 16m system defines the relation between a 16e frame and a 16m frame. An offset with a fixed sub-frame length between the 16m frame and the 16e frame is called 16m frame start offset, namely the offset between the starting location of the 16e frame and the starting location of the 16m frame, and the offset takes a sub-frame as its unit, as shown in FIG. 2.

At present, no good solution is available for solving the problems of how to allocate 16e downlink sub-frames and 16m downlink sub-frames in downlink sub-frames of a 16m frame, how to indicate allocation information of the downlink sub-frames and how for a terminal to acquire the allocation scheme.

SUMMARY

In order to solve the existing technical problem, the present invention provides a method for downlink sub-frame allocation in an evolved WiMAX system, which can ensure the alignment of synchronization symbols of different base stations.

The present invention provides a method for downlink sub-frame allocation in an evolved WiMAX system, wherein the evolved WiMAX system is an IEEE 802.16m system and hereinafter the IEEE 802.16m is referred to as 16m for short; and the method for downlink sub-frame allocation comprises:

setting a 16m frame start offset as a parameter of a deployment area range, and setting a starting location of a 16m frame by each 16m base station within a same deployment area range in the system according to the 16m frame start offset;

always allocating a start sub-frame of the 16m frame by the 16m base station as a 16m downlink sub-frame, and sending a super frame header including a synchronization symbol at the starting location of a first frame of a super-frame;

or always allocating a start sub-frame of the 16m frame by the 16m base station as a 16m downlink sub-frame, and sending a synchronization symbol at the starting location of a first frame of a super-frame; sending by the 16m base station a super frame header in a start sub-frame of the first frame of the super-frame; and Time Division Multiplex (TDM) is performed on the synchronization symbol and the super frame header in the first frame of the super-frame;

wherein the deployment area is the coverage of a neighboring cell configured or determined by an operator.

Further, the method for downlink sub-frame allocation may also be characterized in that:

a number of downlink sub-frames of the 16m frame is N, and when N≥3, a value range of the 16m frame start offset is [1, N−2];

when N=2, the 16m frame start offset is 1; N depends on a ratio of downlink sub-frames to uplink sub-frames in the 16m frame and is a parameter of the deployment area range.

Further, the method for downlink sub-frame allocation may also be characterized in that the 16m frame start offset is set as 1 or 2 sub-frames.

Further, the method for downlink sub-frame allocation may also be characterized in that:

the evolved WiMAX system is a backward compatible 16m system;

the method for downlink sub-frame allocation further comprises: determining by the 16m base station a ratio of 16m downlink sub-frames to 16e downlink sub-frames in the 16m frame according to requirements of current 16m service and 16e service.

Further, the method for downlink sub-frame allocation may further comprise:

taking by the 16m base station a number of 16m downlink sub-frames in the 16m frame as a parameter of a sector specific, and respectively determining the number of 16m downlink sub-frames in the 16m frame in each sector according to requirements of current 16m service and 16e service of each sector and a ratio of downlink sub-frames to uplink sub-frames in the 16m frame set in the deployment area range to which the 16m base station belongs.

Further, the method for downlink sub-frame allocation may also be characterized in that: the number of 16m downlink sub-frames in the 16m frame in a same sector varies by taking a super-frame as a minimum periodicity.

Further, the method for downlink sub-frame allocation may further comprise:

allocating by the 16m base station each downlink sub-frame of the 16m frame as a 16m downlink sub-frame or a 16e downlink sub-frame per a preset allocation method according to the 16m frame start offset, the number of downlink sub-frames and the ratio of the 16m downlink sub-frames to the 16e downlink sub-frames, which are all set in the deployment area range to which the 16m base station belongs, wherein the start sub-frame of the 16m frame is always allocated as a 16m downlink sub-frame and a first downlink sub-frame following an uplink to downlink switch point is always allocated as a 16e downlink sub-frame.

Further, the method for downlink sub-frame allocation may also be characterized in that:

the 16m frame start offset is L, the number of downlink sub-frames of the 16m frame is N, the number of 16m downlink sub-frames in the N downlink sub-frames is M, a number of downlink sub-frames included between the starting location of the 16m frame and a downlink to uplink switch point is P, where P=N−L, and the preset allocation method is:

if M≤P, a first M downlink sub-frames including the start sub-frame in the 16m frame are all allocated as 16m downlink sub-frames, and other downlink sub-frames are allocated as 16e downlink sub-frames;

if N>M>P, a first downlink sub-frame to a $(N-M)^{th}$ downlink sub-frame in the 16m frame which follow the uplink to downlink switch point are all allocated as 16e downlink sub-frames, and other downlink sub-frames are all allocated as 16m downlink sub-frames.

The method of the present invention supports downlink sub-frame allocation in a backward compatible 16m system, makes different base stations flexibly configure the ratio of 16m downlink sub-frames to 16e downlink sub-frames according to service requirements and simultaneously, ensures the synchronous transmission of synchronization symbols of different base stations, prevents the mutual interference caused by nonalignment of the synchronization symbols and does not bring about the problem of neighboring cell interference because of the change of the configuration ratio of 16m downlink sub-frames to 16e downlink sub-frames. Meanwhile, under neighboring frequency coexistence with other TDD systems, the method would avoid great impact, caused by puncture, on synchronization channels and the reception of some information required by the access of a system.

In order to solve the existing technical problem, the present invention also provides a method for downlink sub-frame allocation and allocation information transmission in an evolved WiMAX system, making a base station capable of flexibly configuring a ratio of 16m downlink sub-frames to 16e downlink sub-frames according to service requirements and capable of transmitting allocation information of downlink sub-frames to a terminal at little expense.

The present invention also provides a method for downlink sub-frame allocation and allocation information transmission in an evolved WiMAX system that is a backward compatible 16m system, and the transmission method comprises:

determining by a 16m base station a number of 16m downlink sub-frames in a 16m frame according to a ratio of downlink sub-frames to uplink sub-frames in the 16m frame and requirements of current 16m service and 16e service set in a deployment area range to which the 16m base station belongs, and then allocating the downlink sub-frames of the 16m frame according to a 16m frame start offset set in the deployment area range to which the 16m base station belongs per a preset allocation method, wherein a start sub-frame of the 16m frame is always allocated as a 16m downlink sub-frame;

writing by the 16m base station the ratio of the downlink sub-frames to the uplink sub-frames in the 16m frame, the 16m frame start offset and information about the number of the 16m downlink sub-frames in the 16m frame into a super frame header which includes a synchronization symbol and is at a starting location of a first frame of a super-frame, and broadcasting them to 16m terminals.

Further, the method for downlink sub-frame allocation and allocation information transmission may also be characterized in that:

the 16m frame start offset and the information about the number of the 16m downlink sub-frames in the 16m frame are both expressed by 3 bits.

Further, the method for downlink sub-frame allocation and allocation information transmission may also be characterized in that:

the number of downlink sub-frames in the 16m frame is N, when N≥3, a value range of the 16m frame start offset is [1, N−2];

when N=2, the 16m frame start offset is 1, and N depends on the ratio of the downlink sub-frames to the uplink sub-frames in the 16m frame and is a parameter of the deployment area range.

Further, the method for downlink sub-frame allocation and allocation information transmission may also be characterized in that:

the 16m frame start offset is L, the number of downlink sub-frames in the 16m frame is N, the number of 16m downlink sub-frames in the N downlink sub-frames is M, a number of downlink sub-frames included between the starting location of the 16m frame and a downlink to uplink switch point is P, where P=N−L, and the preset allocation method is:

if M≤P, a first M downlink sub-frames including the start sub-frame in the 16m frame are all allocated as 16m downlink sub-frames, and other downlink sub-frames are allocated as 16e downlink sub-frames;

if N>M>P, a first downlink sub-frame to a (N−M)$^{th}$ downlink sub-frame in the 16m frame which follow an uplink to downlink switch point are all allocated as 16e downlink sub-frames, and other downlink sub-frames are all allocated as 16m downlink sub-frames.

The above-mentioned method of the present invention can be used to allocate 16m sub-frames and 16e sub-frames according to an actual service requirement of a backward compatible 16e system in a quasi-dynamic manner. Besides, the change of different 16m and 16e downlink sub-frame allocation methods can be indicated at little expense.

In order to solve the existing technical problem, the present invention also provides a method for acquiring downlink sub-frame allocation information by a 16m terminal in an evolved WiMAX system, making the 16m terminal capable of acquiring allocation information of 16m downlink sub-frames simply and rapidly.

The present invention provides a method for acquiring 16m sub-frame allocation information by a 16m terminal to in a backward compatible 16m system, comprising:

after downlink synchronization, acquiring by a 16m terminal frame configuration information from a super frame header, wherein the frame configuration information represents or carries information such as a 16m frame start offset, a ratio of downlink sub-frames to uplink sub-frames in a 16m frame and a number of 16m downlink sub-frames in the 16m frame, etc., and according to the acquired information and a preset determining method, determining by the 16m terminal which downlink sub-frames of the 16m frame are 16m downlink sub-frames, wherein a start sub-frame of the 16m frame is always set as a 16m downlink sub-frame.

Further, the method for acquiring 16m sub-frame allocation information by a 16m terminal may be also characterized in that:

the 16m frame start offset is L, a number of downlink sub-frames in the 16m frame is N, the number of 16m downlink sub-frames in the N downlink sub-frames is M, a number of downlink sub-frames included between a starting location of the 16m frame and a downlink to uplink switch point is P, where P=N−L, and the preset determining method is:

if M≤P, a first M downlink sub-frames including the start sub-frame in the 16m frame are determined as 16m downlink sub-frames;

if N>M>P, except a first downlink sub-frame to a (N−M)$^{th}$ downlink sub-frame in the 16m frame which follow an uplink to downlink switch point, other downlink sub-frames are all 16m downlink sub-frames.

Through the above-mentioned method of the present invention, the 16m terminal can acquire the allocation information of the 16m downlink sub-frames simply and rapidly.

DETAILED DESCRIPTION

The embodiment of the present invention is described in detail hereinafter with reference to attached drawings.

Figure 3:
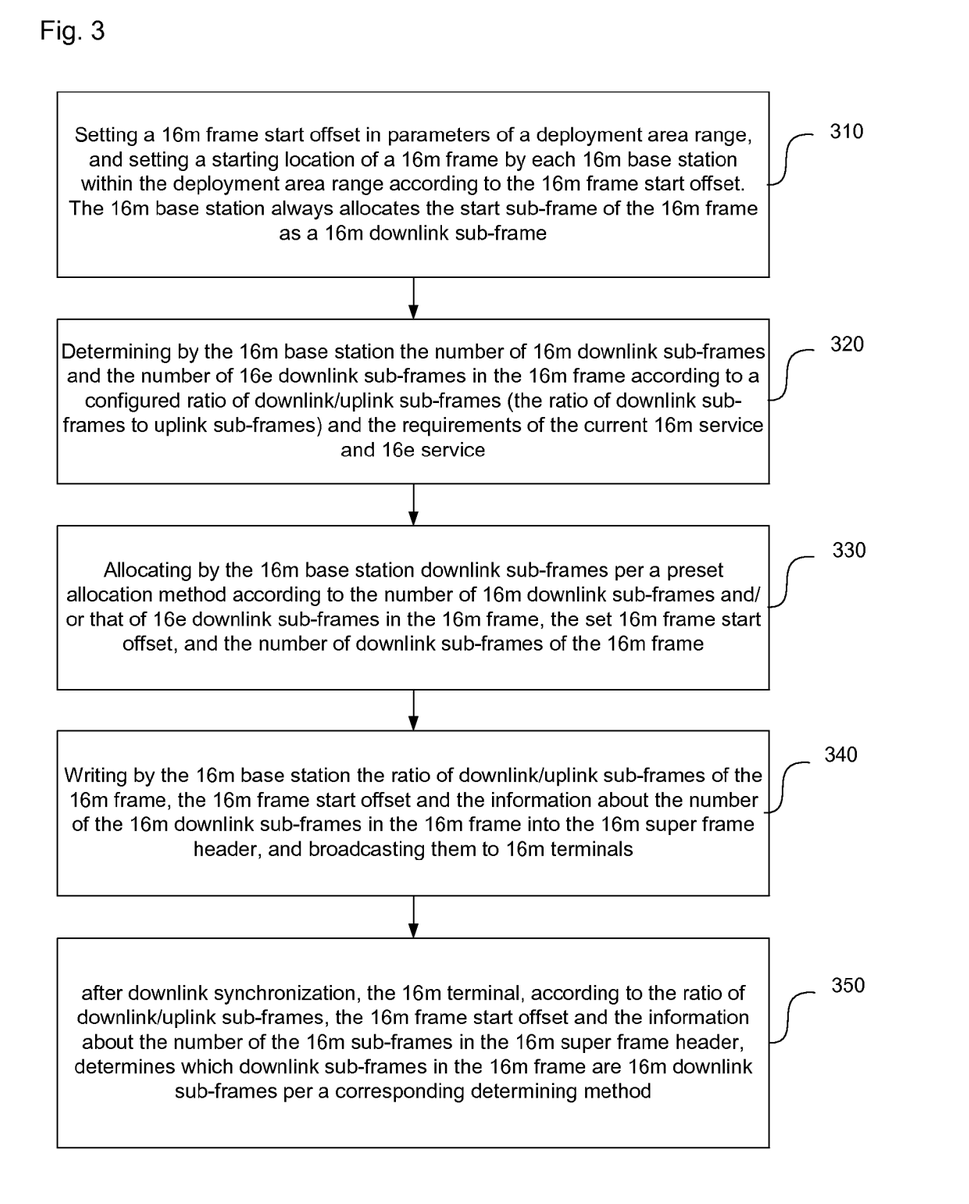
FIG. 3 is a flowchart of a method for downlink sub-frame allocation, indication, and acquisition of downlink sub-frame allocation information by a terminal in a backward compatible 16m system according to an embodiment of the present invention.

Taking a backward compatible 16m system for example, the embodiment describes a method for downlink sub-frame allocation in a 16m system, and a non-backward-compatible 16m system can also adopt this method. As shown in FIG. 3, the method includes the following steps.

Step 310: setting a 16m frame start offset in parameters of a deployment area range, and setting a starting location of a 16m frame by each 16m base station within the deployment area range according to the 16m frame start offset. The 16m base station always allocates the start sub-frame of the 16m frame as a 16m downlink sub-frame. In this way, a super frame header containing a synchronization symbol is sent at the starting location of the start sub-frame of the first frame of a super-frame, or the synchronization symbol is sent at the starting location of the start sub-frame of the first frame of the super-frame and the synchronization symbol and the super frame header are sent in the start sub-frame of the first frame of the super-frame. TDM is performed on the synchronization symbol and the super frame header in the first frame of the super-frame.

In the embodiment, the 16m frame start offset is set as a parameter of the deployment area range (also called deployment wide). In a same deployment area range, both the backward compatible and the non-backward-compatible 16m system set the starting location of the 16m frame according to the frame start offset which is set in the deployment area range and allocate the first frame beginning from the starting location, namely the start sub-frame, as a 16m downlink sub-frame.

As the super-frame might begin from the synchronization symbol (also called a lead code symbol used for synchronization), in order to ensure the alignment of synchronization symbols of different base stations, one consideration is that the super frame header containing a synchronization symbol is always placed at the starting location of the last downlink sub-frame (the downlink sub-frame is always allocated as a 16m downlink sub-frame) near a downlink/uplink switch point. However, as the 16m system needs to be neighboring frequency coexistence with other TDD systems, for example neighboring frequency coexistence with an LTE-TDD system and TD-SCDMA. In a coexistence scheme, generally a sub-frame near the downlink/uplink switch point or partial symbols in the sub-frame are punctured, and thus synchronization channels and some information required by the access of a system will be greatly affected.

In order to avoid the impact on synchronization channels by puncture to the greatest extent, the value range of the 16m frame start offset is set to [1, N−2], if the number of downlink sub-frames of the 16m frame is N, and N is greater than or equals to 3; preferably the range of the 16m frame start offset is set to 1 or 2. In this way, a downlink sub-frame prior to the downlink/uplink switch point (downlink to uplink switch point) of the frame will not be set as the start sub-frame; the super frame header will not be in a downlink sub-frame prior to the downlink/uplink switch point; and therefore, when the 16m system is in neighboring frequency coexistence with other TDD systems, puncture will not greatly affect synchronization channels and the reception of some information required by the access of a system. When N equals to 2, the 16m frame start offset is 1. N depends on the ratio of downlink/uplink sub-frames of the 16m frame and is a parameter of the deployment area range.

As each 16m frame start offset in the deployment area range is the same and will not change due to different ratios of 16m downlink sub-frames to 16e downlink sub-frames, therefore the embodiment can ensure the synchronous transmission of synchronization symbols of different base stations. A super-frame might have multiple synchronization symbols and the interval between each two synchronization symbols is identical, therefore, it would be fine to align with only one of the symbols.

Step 320: determining by the 16m base station the number of 16m downlink sub-frames and the number of 16e downlink sub-frames (or the ratio between them) in the 16m frame according to a configured ratio of downlink/uplink sub-frames (the ratio of downlink sub-frames to uplink sub-frames) and the requirements of the current 16m service and 16e service;

The embodiment takes information about the number of 16m downlink sub-frames and/or the number of 16e downlink sub-frames in the 16m frame, for example the ratio of the 16m downlink sub-frames to the 16e downlink sub-frames, as a parameter of a sector specific. For the backward compatible 16m system, the number of 16m downlink sub-frames and that of 16e downlink sub-frames in the 16m frame in each sector are respectively determined according to the requirements of the current 16m service and 16e service of each sector and the ratio of downlink sub-frames to uplink sub-frames of the 16m frame set in the deployment area range to which the 16m base station belongs. The ratio of 16m downlink sub-frames to 16e downlink sub-frames in 16m frame in different sectors may be different. In a 16m frame in a same sector, the number varies by taking a super-frame as a minimum periodicity, namely the allocation of 16m sub-frames and 16e sub-frames in different super-frames may be different, and moreover, in a same sector, the ratio of 16m sub-frames to 16e sub-frames may be adjusted according to the change of service.

Step 330: allocating by the 16m base station each downlink sub-frame of the 16m frame as a 16m downlink sub-frame or a 16e downlink sub-frame per a preset allocation method according to the number of 16m downlink sub-frames and/or that of 16e downlink sub-frames in the 16m frame, the set 16m frame start offset, and the number of downlink sub-frames of the 16m frame;

To make the backward compatible 16m system (in this system, the number of 16e downlink sub-frames is greater than or equals to 1) compatible with the 16e system, a first downlink sub-frame following the uplink/downlink switch point (the uplink to downlink switch point) in the 16m frame is always allocated as a 16e downlink sub-frame.

According to different configurations of the ratio of 16m sub-frames to 16e sub-frames, in the 16m frame structure, 16m downlink sub-frames and 16e downlink sub-frames may be sequentially included, or only the 16m downlink sub-frames are included between the 16m frame starting location and the downlink/uplink switch point; while only 16e downlink sub-frames may be included, or 16e downlink sub-frames and 16m downlink sub-frames may be sequentially included, or only 16m downlink sub-frames (for the 16m-only system) are included between the uplink/downlink switch point and the 16m frame starting location. The number of 16m downlink sub-frames may also be equal to the number of downlink sub-frames of the frame, that is, the sector is configured as a 16m-only system.

Figure 4A:
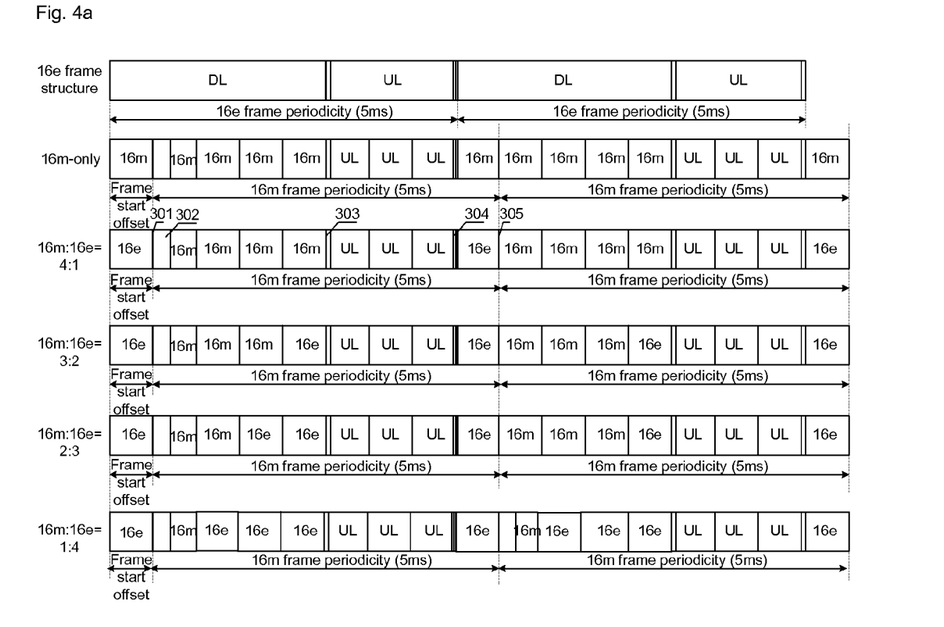
FIG. 4*a* and FIG. 4*b* are diagrams illustrating allocation of 16m downlink sub-frames and 16e downlink sub-frames in a frame in a backward compatible 16m system according to an embodiment of the present invention when the 16m frame start offset is 1 and 2 respectively.
Figure 4B:
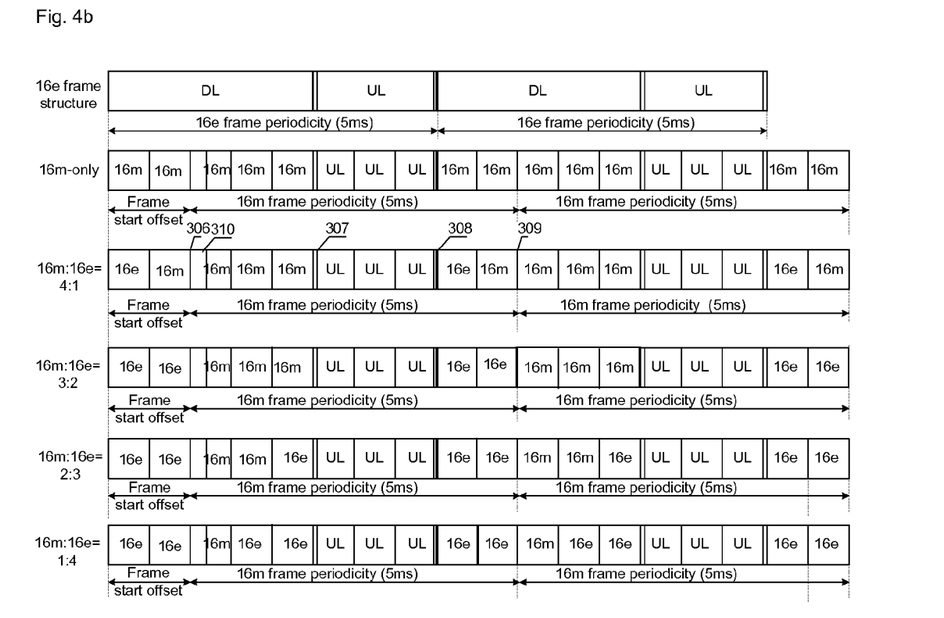

FIG. 4a and FIG. 4b are diagrams illustrating the allocation of 16m downlink sub-frames and 16e downlink sub-frames in a frame in a backward compatible 16m system according to the embodiment when the 16m frame start offset is 1 and 2 respectively, and the ratio of the downlink/uplink sub-frames in the frame is 5:3.

As to the backward compatible 16m system, downlink sub-frames of the frame comprise 16m downlink sub-frames and 16e downlink sub-frames. The ratio of the 16m downlink sub-frames to the 16e downlink sub-frames may be 4:1, 3:2, 2:3 or 1:4. As some base stations belonging to a 16m-only system and some base stations belonging to a backward compatible 16m system may exist in the same area, the 16m-only system is also required to accord with the backward compatible 16m system in terms of the allocation method of downlink sub-frames, but the downlink sub-frames of the 16m-only system are all 16m downlink sub-frames. For easy description, the allocation situation of downlink sub-frames in the 16m-only system is also illustrated in the Figures.

In FIG. 4a, the 16m frame start offset in the deployment wide is 1 sub-frame, the frame start offset in the backward compatible 16m system and the frame start offset in the 16m-only system in the deployment wide are all 1 sub-frame, and a synchronization channel 302 is at the starting location 301 of the first 16m frame of a 16m super-frame.

When the ratio of 16m downlink sub-frames to 16e downlink sub-frames is 4:1, 4 downlink sub-frames between the starting location 301 of the 16m frame and a downlink/uplink switch point 303 are all 16m downlink sub-frames;

when the ratio of 16m downlink sub-frames to 16e downlink sub-frames is 3:2, the first 3 downlink sub-frames between the starting location 301 of the 16m frame and the downlink/uplink switch point 303 are 16m downlink sub-frames and the last downlink sub-frame is a 16e downlink sub-frame;

when the ratio of 16m downlink sub-frames to 16e downlink sub-frames is 2:3, the first 2 downlink sub-frames between the starting location 301 of the 16m frame and the downlink/uplink switch point 303 are 16m downlink sub-frames and the last two downlink sub-frames are 16e downlink sub-frames;

when the ratio of 16m downlink sub-frames to 16e downlink sub-frames is 1:4, the first downlink sub-frame between the starting location 301 of the 16m frame and the downlink/uplink switch point 303 is a 16m downlink sub-frame and the last three downlink sub-frames are 16e downlink sub-frames.

When the ratio of 16m downlink sub-frames to 16e downlink sub-frames is 4:1, 3:2, 2:3 or 1:4, a downlink sub-frame between an uplink/downlink switch point 304 and a next 16m frame start 305 is a 16e downlink sub-frame.

In FIG. 4b, the 16m frame start offset in the deployment wide is 2 sub-frames, the frame start offset in the backward compatible 16m system and the frame start offset in the 16m-only system in the deployment wide are all 2 sub-frames, and a synchronization channel 310 is at the starting location 306 of the first 16m frame of a 16m super-frame.

When the ratio of 16m downlink sub-frames to 16e downlink sub-frames is 4:1, the 3 downlink sub-frames between the starting location 306 of the 16m frame and a downlink/uplink switch point 307 are all 16m downlink sub-frames, the first downlink sub-frame between an uplink/downlink switch point 308 and a next 16m frame start 309 is a 16e downlink sub-frame and the second downlink sub-frame is a 16m downlink sub-frame;

when the ratio of 16m downlink sub-frames to 16e downlink sub-frames is 3:2, the 3 downlink sub-frames between the starting location 306 of the 16m frame and the downlink/uplink switch point 307 are 16m downlink sub-frames;

when the ratio of 16m downlink sub-frames to 16e downlink sub-frames is 2:3, the first 2 downlink sub-frames between the starting location 306 of the 16m frame and the downlink/uplink switch point 307 are 16m downlink sub-frames and the last downlink sub-frame is a 16e downlink sub-frame;

when the ratio of 16m downlink sub-frames to 16e downlink sub-frames is 1:4, the first downlink sub-frame between the starting location 306 of the 16m frame and the downlink/uplink switch point 307 is a 16m downlink sub-frame and the last two downlink sub-frames are 16e downlink sub-frames.

When the ratio of 16m downlink sub-frames to 16e downlink sub-frames is 3:2, 2:3 or 1:4, two downlink sub-frames between the uplink/downlink switch point 308 and the next 16m frame start 309 are both 16e downlink sub-frames.

Figure 5A:
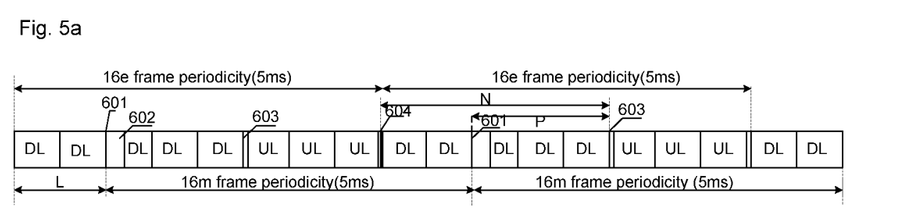
FIG. 5*a* to FIG. 5*d* are diagrams illustrating allocation of 16m sub-frames and 16e sub-frames respectively under four different situations.

The allocation methods above can be summarized into the following situations, please refer to the examples in FIG. 5a to FIG. 5d. In the examples, the ratio of downlink/uplink sub-frames in a frame is 5:3 and thus the number of downlink sub-frames is N=5. The 16m frame start offset is L=2, the number of 16m downlink sub-frames is M, a total of P downlink sub-frames exist between the starting location 601 of the 16m frame and a downlink/uplink switch point 603, and P=N−L=3, as shown in FIG. 5a.

Figure 5B:
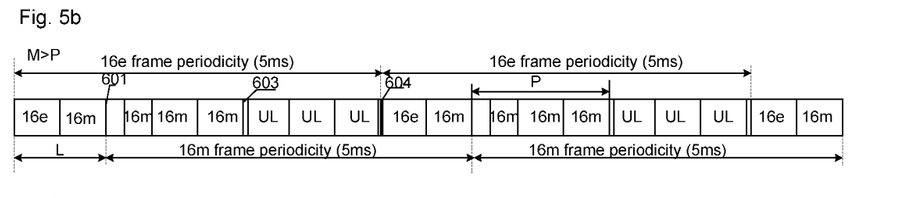

FIG. 5b shows an allocation situation of downlink sub-frames when P is less than M. The number of 16m downlink sub-frames is M and M is 4, then the P=3 downlink sub-frames between the start sub-frame 601 of the 16m frame and the downlink/uplink switch point 603 are all 16m downlink sub-frames. Beginning from an uplink/downlink switch point 604 to the sub-frame start 601 of the 16m frame, (N−M)=1 16e sub-frame exists after the uplink/downlink switch point 604, and (M−P)=1 16m downlink sub-frame exists after the 16e sub-frame and prior to the start 601 of a next 16m frame.

Figure 5C:
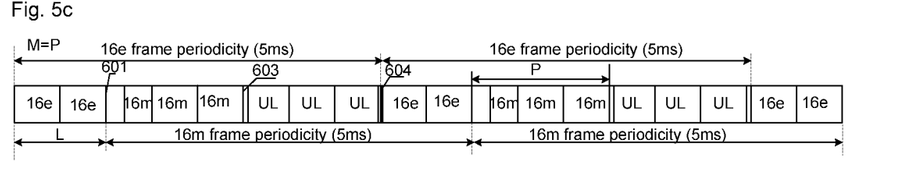

FIG. 5c shows an allocation situation of downlink sub-frames when P equals to M. The number of 16m downlink sub-frames is M and M is 3, then the P=3 downlink sub-frames between the start 601 of the 16m frame and the downlink/uplink switch point 603 are all 16m downlink sub-frames. L sub-frames between the uplink/downlink switch 604 and the start 601 of a next 16m frame are all 16e downlink sub-frames.

Figure 5D:
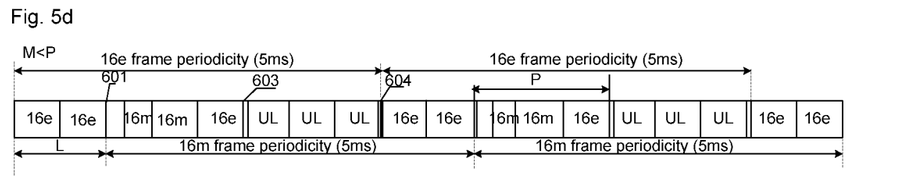

FIG. 5d shows an allocation situation of downlink sub-frames when P is greater than M. The number of 16m downlink sub-frames is M and M is 2, then beginning from the starting position 601 of the 16m frame, the M=2 continuous downlink sub-frames are 16m downlink sub-frames and (P−M)=1 downlink sub-frame prior to the downlink/uplink switch point 603 is a 16e downlink sub-frame. L sub-frames between the uplink/downlink switch 604 and the start 601 of a next 16m frame are all 16e downlink sub-frames.

The allocation methods are summarized as follows:

if M≤P, the first M downlink sub-frames including the start sub-frame in the 16m frame are all allocated as 16m downlink sub-frames, and other downlink sub-frames are allocated as 16e downlink sub-frames;

if N>M>P, the first downlink sub-frame to the (N−M)$^{th}$ downlink sub-frame in the 16m frame which follow the uplink to downlink switch point are all allocated as 16e downlink sub-frames, and other downlink sub-frames are all allocated as 16m downlink sub-frames;

herein a situation in the 16m-only system is complemented, namely when N=M, all downlink sub-frames in the 16m frame are allocated as 16m downlink sub-frames.

Step 340, writing by the 16m base station the ratio of downlink/uplink sub-frames of the 16m frame, the 16m frame start offset and the information about the number of the 16m downlink sub-frames in the 16m frame into the 16m super frame header, and broadcasting them to 16m terminals.

The following table is one example of information relevant to allocation indication of downlink sub-frames in the super frame header of the embodiment. The information mainly includes 3-bit information about the 16m frame start offset, 3-bit information about the number of the 16m downlink sub-frames, 3-bit information about the ratio of downlink/uplink sub-frames, and 1-bit information about the number of switch points relevant to the ratio of the downlink/uplink sub-frames. As to the backward compatible 16m system, the number of switch points is 2.

| Field | Size | Description |
|---|---|---|
| ... | | |
| Number of switch points | 1 bit | 0: default, 2 switch points<br>1: 4 switch points |
| ratio of downlink/uplink sub-frames | 3 bits | If the number of switch points is 2, then:<br>000: 7:1<br>001: 6:2<br>010: 5:3<br>011: 4:4<br>100: 3:5<br>101: 2:6<br>110, 111: reserved |
| 16m frame start offset | 3 bits | The offset between the starting location of a 16m frame and the starting location of a 16e frame, taking a sub-frame as a unit |
| Number of downlink 16m sub-frames | 3 bits | |
| ... | | |

Step 350, after downlink synchronization, the 16m terminal, according to the ratio of downlink/uplink sub-frames, the 16m frame start offset and the information about the number of the 16m sub-frames in the 16m super frame header, determines which downlink sub-frames in the 16m frame are 16m downlink sub-frames per a determining method corresponding to the preset allocation method of the 16m base station.

The 16m terminal acquires synchronization at the start sub-frame of the 16m frame comprising a synchronization channel. Supposing that a total of P=N−L downlink sub-frames exist between the start sub-frame of the 16m frame and the downlink/uplink switch point, wherein N expresses the number of the downlink sub-frames and the L expresses the 16m frame start offset. The corresponding determining method is as follows:

if P=M, then the downlink sub-frames between the start sub-frame of the 16m frame and the downlink/uplink switch point are all 16m downlink sub-frames. The L sub-frames between the uplink/downlink switch point and the start of a next 16m frame are all 16e downlink sub-frames;

if P>M, the first M continuous downlink sub-frames including the start sub-frame in the 16m frame are 16m downlink sub-frames, the (P−M) downlink sub-frames prior to the downlink/uplink switch point are 16e downlink sub-frames, and the sub-frames between the uplink/downlink switch point and the start sub-frame of a next 16m frame are all 16e downlink sub-frames;

if P<M, the P downlink sub-frames between the start sub-frame of the 16m frame and the downlink/uplink switch point are 16m downlink sub-frames, (N−M) 16e sub-frames exist after the uplink/downlink switch point, and (M−P) 16m downlink sub-frames exist after the 16e sub-frame and prior to the start of the 16m frame.

The corresponding determining method can be summarized as follows:

if M≤P, then the first M downlink sub-frames including the start sub-frame in the 16m frame are 16m downlink sub-frames;

if N>M>P, except the first downlink sub-frame to the (N−M)$^{th}$ downlink sub-frame in the 16m frame which follows the uplink to downlink switch point, other downlink sub-frames are all 16m downlink sub-frames;

herein a situation in the 16m-only system is complemented, namely when N=M, all downlink sub-frames in the 16m frame are 16m downlink sub-frames.

Certainly, the present invention also has many other embodiments. For those skilled in the art, without departing from the principle of the present invention, various changes and modifications can be made to the invention, which should also be included within the protection range of the claims of the present invention attached hereinafter.

INDUSTRIAL APPLICABILITY

Compared with the prior art, the above-mentioned method of the present invention supports downlink sub-frame allocation in a backward compatible 16m system, makes different base stations flexibly configure the ratio of 16m downlink sub-frames to 16e downlink sub-frames according to service requirements and simultaneously, ensures the synchronous transmission of synchronization symbols of different base stations, prevents the mutual interference caused by non-alignment of the synchronization symbols and besides, avoids great impact, caused by puncture, on synchronization channels and the reception of some information required by the access of a system under neighboring frequency coexistence with other TDD systems.

What is claimed is:

1. A method for downlink sub-frame allocation in an evolved Worldwide Interoperability for Microwave Access (WiMAX) system, wherein the evolved WiMAX system is a backward compatible IEEE802.16m system and hereinafter the IEEE802.16m is referred to as 16m for short, the method for downlink sub-frame allocation comprising:

setting a 16m frame start offset as a parameter of a deployment area range, and setting a starting location of a 16m frame by each 16m base station within a same deployment area range in the system according to the 16m frame start offset;

always allocating a start sub-frame of the 16m frame by the 16m base station as a 16m downlink sub-frame, and sending a super frame header including a synchronization symbol at the starting location of a first frame of a super-frame, wherein the method further comprising: determining by the 16m base station a ratio of 16m downlink sub-frames to IEEE 802.16e downlink sub-frames in the 16m frame according to requirements of current 16m service and IEEE 802.16e service, and hereinafter the IEEE802.16e is referred to as 16e for short.

2. The method for downlink sub-frame allocation according to claim 1, wherein a number of downlink sub-frames of the 16m frame is N, and when N≥3, a value range of the 16m frame start offset is [1, N−2].

3. The method for downlink sub-frame allocation according to claim 2, wherein the 16m frame start offset is set as 1 or 2 sub-frames.

4. The method for downlink sub-frame allocation according to claim 1, wherein a number of downlink sub-frames of the 16m frame is N, and when N=2, the 16m frame start offset is 1.

5. The method for downlink sub-frame allocation according to claim 1, further comprising:

taking by the 16m base station a number of 16m downlink sub-frames in the 16m frame as a parameter of a sector specific, and respectively determining the number of 16m downlink sub-frames in the 16m frame in each sector according to requirements of current 16m service and 16e service of each sector and a ratio of downlink sub-frames to uplink sub-frames in the 16m frame set in the deployment area range to which the 16m base station belongs.

6. The method for downlink sub-frame allocation according to claim 5, wherein the number of 16m downlink sub-frames in the 16m frame in a same sector varies by taking a super-frame as a minimum periodicity.

7. The method for downlink sub-frame allocation according to claim 6, further comprising:

allocating by the 16m base station each downlink sub-frame of the 16m frame as a 16m downlink sub-frame or a 16e downlink sub-frame per a preset allocation method according to the 16m frame start offset, the number of downlink sub-frames and the ratio of the 16m downlink sub-frames to the 16e downlink sub-frames, which are all set in the deployment area range to which the 16m base station belongs, wherein the start sub-frame of the 16m frame is always allocated as a 16m downlink sub-frame and a first downlink sub-frame following an uplink to downlink switch point is always allocated as a 16e downlink sub-frame.

8. The method for downlink sub-frame allocation according to claim 7, wherein the 16m frame start offset is L, the number of downlink sub-frames of the 16m frame is N, the number of 16m downlink sub-frames in the N downlink sub-frames is M, a number of downlink sub-frames included between the starting location of the 16m frame and a downlink to uplink switch point is P, where P=N−L, and the preset allocation method is:

if M≤P, a first M downlink sub-frames including the start sub-frame in the 16m frame are all allocated as 16m downlink sub-frames, and other downlink sub-frames are allocated as 16e downlink sub-frames;

if N>M>P, a first downlink sub-frame to a (N−M)$^{th}$ downlink sub-frame in the 16m frame which follow the uplink to downlink switch point are all allocated as 16e downlink sub-frames, and other downlink sub-frames are all allocated as 16m downlink sub-frames.

9. The method for downlink sub-frame allocation according to claim 1, further comprising:

allocating by the 16m base station each downlink sub-frame of the 16m frame as a 16m downlink sub-frame or a 16e downlink sub-frame per a preset allocation method according to the 16m frame start offset, the number of downlink sub-frames and the ratio of the 16m downlink sub-frames to the 16e downlink sub-frames, which are all set in the deployment area range to which the 16m base station belongs, wherein the start sub-frame of the 16m frame is always allocated as a 16m downlink sub-frame and a first downlink sub-frame following an uplink to downlink switch point is always allocated as a 16e downlink sub-frame.

10. The method for downlink sub-frame allocation according to claim 9, wherein the 16m frame start offset is L, the number of downlink sub-frames of the 16m frame is N, the number of 16m downlink sub-frames in the N downlink sub-frames is M, a number of downlink sub-frames included between the starting location of the 16m frame and a downlink to uplink switch point is P, where P=N−L, and the preset allocation method is:
   if M≤P, a first M downlink sub-frames including the start sub-frame in the 16m frame are all allocated as 16m downlink sub-frames, and other downlink sub-frames are allocated as 16e downlink sub-frames;
   if N>M>P, a first downlink sub-frame to a (N−M)$^{th}$ downlink sub-frame in the 16m frame which follow the uplink to downlink switch point are all allocated as 16e downlink sub-frames, and other downlink sub-frames are all allocated as 16m downlink sub-frames.

11. A method for downlink sub-frame allocation and allocation information transmission in an evolved Worldwide Interoperability for Microwave Access (WiMAX) system, wherein the evolved WiMAX system is a backward compatible IEEE802.16m system and hereinafter the IEEE802.16m is referred to as 16m for short, the method comprising:
   determining by a 16m base station a number of 16m downlink sub-frames in a 16m frame according to a ratio of downlink sub-frames to uplink sub-frames in the 16m frame and requirements of current 16m service and IEEE 802.16e service set in a deployment area range to which the 16m base station belongs, and then allocating the downlink sub-frames of the 16m frame according to a 16m frame start offset set in the deployment area range to which the 16m base station belongs per a preset allocation method, wherein a start sub-frame of the 16m frame is always allocated as a 16m downlink sub-frame, and hereinafter the IEEE802.16e is referred to as 16e for short;
   writing by the 16m base station the ratio of the downlink sub-frames to the uplink sub-frames in the 16m frame, the 16m frame start offset and information about the number of the 16m downlink sub-frames in the 16m frame into a super frame header which includes a synchronization symbol and is at a starting location of a first frame of a super-frame, and broadcasting them to 16m terminals.

12. The method according to claim 11, wherein the 16m frame start offset and the information about the number of 16m downlink sub-frames in the 16m frame are both expressed by 3 bits.

13. The method according to claim 12, wherein the number of downlink sub-frames in the 16m frame is N, when N≥3, a value range of the 16m frame start offset is [1, N−2], when N=2, the 16m frame start offset is 1, and N depends on the ratio of the 16m downlink sub-frames to the uplink sub-frames in the 16m frame and is a parameter of the deployment area range.

14. The method according to claim 12, wherein
the 16m frame start offset is L, the number of downlink sub-frames in the 16m frame is N, the number of 16m downlink sub-frames in the N downlink sub-frames is M, a number of downlink sub-frames included between the starting location of the 16m frame and a downlink to uplink switch point is P, where P=N−L, and the preset allocation method is:
   if M≤P, a first M downlink sub-frames including the start sub-frame in the 16m frame are all allocated as 16m downlink sub-frames, and other downlink sub-frames are allocated as 16e downlink sub-frames;
   if N>M>P, a first downlink sub-frame to a (N−M)$^{th}$ downlink sub-frame in the 16m frame which follow an uplink to downlink switch point are all allocated as 16e downlink sub-frames, and other downlink sub-frames are all allocated as 16m downlink sub-frames.

15. A method for acquiring IEEE802.16m sub-frame allocation information by a IEEE802.16m terminal in a backward compatible IEEE802.16m system and hereinafter the IEEE802.16m is referred to as 16m for short, comprising:
   after downlink synchronization, acquiring by a 16m terminal frame configuration information from a super frame header, wherein the frame configuration information represents or carries a 16m frame start offset, a ratio of downlink sub-frames to uplink sub-frames in a 16m frame and a number of 16m downlink sub-frames in the 16m frame, and according to the acquired information and a preset determining method, determining by the 16m terminal which downlink sub-frames in the 16m frame are 16m downlink sub-frames, wherein a start sub-frame of the 16m frame is always set as a 16m downlink sub-frame,
   wherein the 16m frame start offset is L, a number of downlink sub-frames in the 16m frame is N, the number of 16m downlink sub-frames in the N downlink sub-frames is M, a number of downlink sub-frames included between a starting location of the 16m frame and a downlink to uplink switch point is P, where P=N−L, and the preset determining method is:
   if M≤P, a first M downlink sub-frames including the start sub-frame in the 16m frame are determined as 16m downlink sub-frames;
   if N>M>P, except a first downlink sub-frame to a (N−M)$^{th}$ downlink sub-frame in the 16m frame which follow an uplink to downlink switch point, other downlink sub-frames are all 16m downlink sub-frames.

16. A method for downlink sub-frame allocation in an evolved Worldwide Interoperability for Microwave Access (WiMAX) system, wherein the evolved WiMAX system is a backward compatible IEEE802.16m system and hereinafter the IEEE802.16m is referred to as 16m for short, the method for downlink sub-frame allocation comprising:
   setting a 16m frame start offset as a parameter of a deployment area range, and setting a starting location of a 16m frame by each 16m base station within a same deployment area range in the system according to the 16m frame start offset;
   always allocating a start sub-frame of the 16m frame by the 16m base station as a 16m downlink sub-frame, and sending a synchronization symbol at the starting location of a first frame of a super-frame,
   wherein the method further comprising: determining by the 16m base station a ratio of 16m downlink sub-frames to IEEE 802.16e downlink sub-frames in the 16m frame according to requirements of current 16m service and IEEE 802.16e service, and hereinafter the IEEE802.16e is referred to as 16e for short.

17. The method for downlink sub-frame allocation according to claim 16, wherein a number of downlink sub-frames of the 16m frame is N, and when N≥3, a value range of the 16m frame start offset is [1, N−2].

18. The method for downlink sub-frame allocation according to claim 16, wherein a number of downlink sub-frames of the 16m frame is N, and when N=2, the 16m frame start offset is 1.

19. The method for downlink sub-frame allocation according to claim 16, further comprising: sending by the 16m base station a super frame header in a start sub-frame of the first frame of the super-frame.

20. The method for downlink sub-frame allocation according to claim 19, wherein Time Division Multiplex (TDM) is performed on the synchronization symbol and the super frame header in the first frame of the super-frame.

\* \* \* \* \*